April 23, 1929.     J. H. CLARK     1,710,206
GUARD RAIL AND OUTER PANEL CONSTRUCTION
Original Filed July 19, 1926
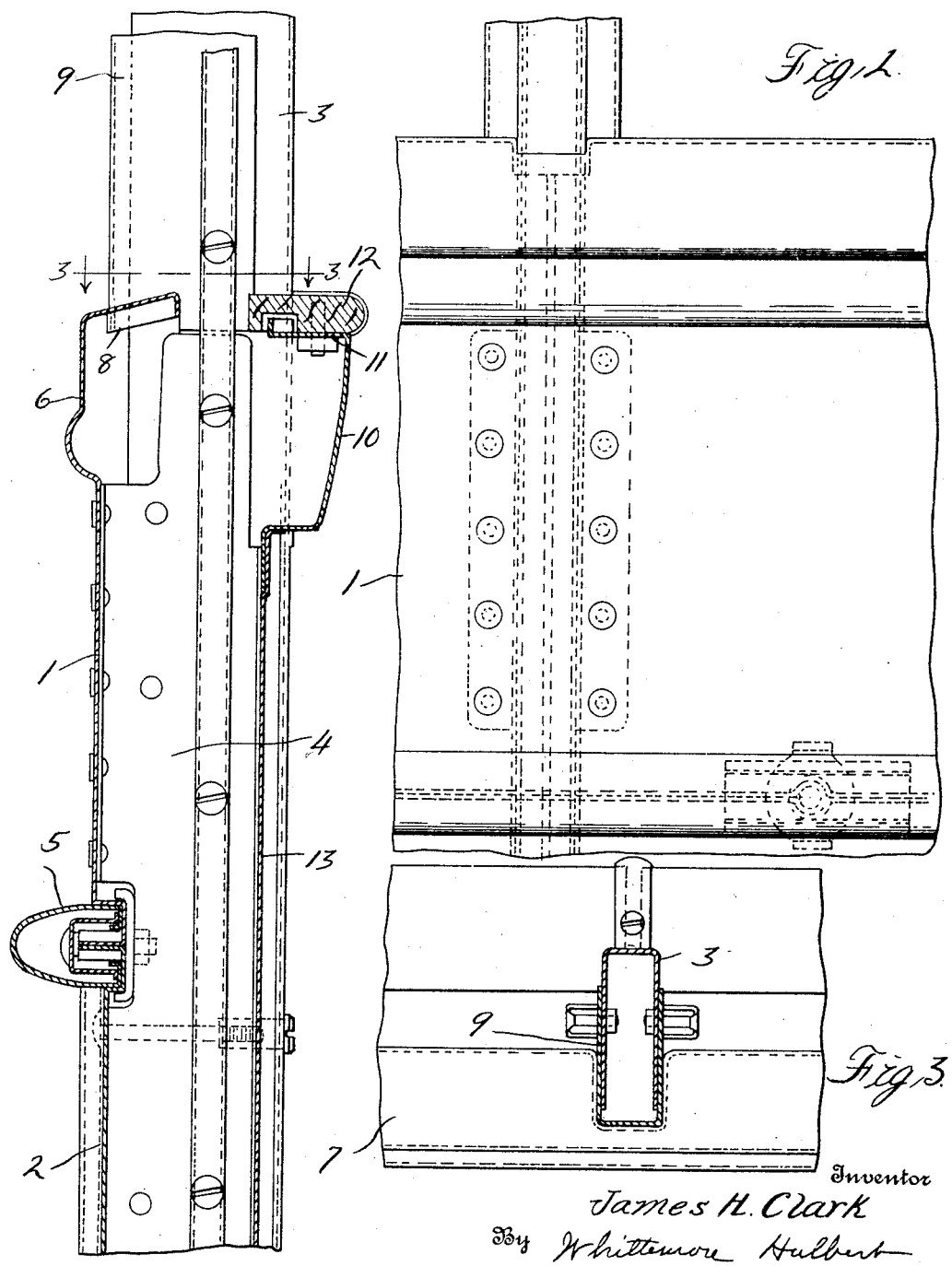

Patented Apr. 23, 1929.

1,710,206

UNITED STATES PATENT OFFICE.

JAMES H. CLARK, OF DETROIT, MICHIGAN, ASSIGNOR TO BRIGGS MANUFACTURING COMPANY, OF DETROIT, MICHIGAN, A CORPORATION OF MICHIGAN.

GUARD RAIL AND OUTER-PANEL CONSTRUCTION.

Original application filed July 19, 1926, Serial No. 123,455. Divided and this application filed June 13, 1927. Serial No. 198,490.

This invention relates generally to the side frame construction of vehicle bodies and particularly to that type designed for use in motor bus bodies and consists of certain novel features of construction, combinations and arrangements of parts as will be more fully described and particularly pointed out in the appended claims.

In the accompanying drawings:

Figure 1 is a side elevation of a side frame construction embodying my invention;

Figure 2 is a sectional view thereof;

Figure 3 is a section taken on line 3—3 of Figure 2.

In the drawings, the numerals 1 and 2 designate upper and lower outside sheet metal panels pressed to the desired shape, while the numeral 3 denotes a supporting pillar therefor which extends vertically from top to bottom of the side frame structure of a motor bus and is of channel-shaped formation having its open portion facing outwardly. Any suitable means may be employed for attaching the panels 1 and 2 to the pillar 3, and in the present instance, I provide a substantially channel-shaped pillar reinforcing member 4, embracing the pillar, the base portion thereof enclosing the open portion of the pillar and abutting against the inner sides of the upper and lower panels 1 and 2 and being securely fastened thereto in any suitable manner.

Extending the length of the bus is a substantially channel-shaped belt guard rail 5 which cooperates with the upper edge of the panel 2 and the lower edge of the panel 1 to form a neat, easily assembled and compact joint. The specific construction of this joint is not described herein as it forms the subject matter of my co-pending application, Serial No. 123,455 filed July 19, 1926, of which the present application is a division thereof.

As shown, the upper extreme portion of the panel 1 is formed into an outside belt rail 6 which is provided with a horizontal inwardly extending portion 7 constituting an outside window frame portion having at its inner end, a downturned flange 8 extending along the edge thereof.

The upper edge of the pillar reinforcing member 4 terminates short of and below the window frame portion 7 while a channel-shaped pillar cover 9 has its lower edge associated with the flange 8. This cover embraces the walls of the pillar, closing the open portion thereof, the side walls of the pillar terminating short of the base of the cover, while the side walls of the cover terminate short of the base of the pillar. It will be noted that the window frame portion 7 is recessed to receive the pillar cover 9 whereby the flange 8 of the window frame embraces the base and a portion of the side walls thereof. The lower edge of the cover 9 terminates with the edge of the flange 8 and is welded thereto. With such an arrangement any up and down variation in the length of the cover can be readily taken care of and if the cover should be a trifle too long, the surplus length can extend beyond the adjacent flanges and the cover can be welded to the flange 8 as aforesaid.

Secured to the inside of the pillar 3 in any suitable manner, is an inside belt rail 10 provided at its upper end with a lateral horizontal flange 11 to which a window ledge 12 is attached. An inside panel 13 is secured to the lower edge of the inside belt rail and is supported upon the pillar 3 in any suitable manner.

While it is believed that from the foregoing description the nature and advantage of my invention will be readily apparent, I desire to have it understood that I do not limit myself to what is herein shown and described, and that such changes may be resorted to when desired as fall within the scope of what is claimed.

What I claim as my invention is:

1. In a vehicle body, the combination with a pillar and a cover therefor, of an outside belt rail supported thereby and having a horizontally extending portion provided with a cut-away portion having a downwardly extending flange embracing said cover, the edges of said cover being welded to said downwardly extending flange.

2. In a vehicle body, the combination with a channel-shaped pillar, of a cover therefor embracing the walls of the pillar and closing the channel thereof, and an outside belt rail having a horizontally extending portion provided with a cut away portion having a downwardly extending flange embracing said cover and secured to the lower edges thereof.

3. In a vehicle body, the combination with a pillar and a cover therefor, of an outside belt rail supported thereby and having a horizontally extending portion provided with a cut-away portion having a downwardly extending flange embracing said cover, the edges of said cover terminating flush with the edges of said flange and being secured thereto.

In testimony whereof I affix my signature.

JAMES H. CLARK.